United States Patent
Balat et al.

(10) Patent No.: US 9,575,751 B2
(45) Date of Patent: Feb. 21, 2017

(54) DATA EXTRACTION AND GENERATION TOOL

(71) Applicant: Microsoft Technology Licensing, LLC, Redmond, WA (US)

(72) Inventors: Mostafa Balat, Copenhagen (DK); Simon Kristiansen Ejsing, Redmond, WA (US); Thomas Hejlsberg, Horsholm (DK); Gert Willem Robyns, Hellerup (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/747,764

(22) Filed: Jun. 23, 2015

(65) Prior Publication Data

US 2016/0378464 A1 Dec. 29, 2016

(51) Int. Cl.
*G06F 9/44* (2006.01)

(52) U.S. Cl.
CPC . *G06F 8/73* (2013.01); *G06F 8/71* (2013.01); *G06F 8/75* (2013.01)

(58) Field of Classification Search
CPC .................. G06F 8/73; G06F 8/71; G06F 8/75
USPC ......................................................... 717/123
See application file for complete search history.

(56) References Cited

U.S. PATENT DOCUMENTS

| | | | |
|---|---|---|---|
| 7,568,184 B1 | 7/2009 | Roth | |
| 8,756,568 B2 | 6/2014 | Hale et al. | |
| 8,819,629 B2 | 8/2014 | Sherrill | |
| 2004/0010776 A1 | 1/2004 | Shah | |
| 2005/0060688 A1 | 3/2005 | Kamalakantha | |
| 2007/0266372 A1 | 11/2007 | Gawor et al. | |
| 2009/0210861 A1 | 8/2009 | Alupului | |
| 2010/0146483 A1 | 6/2010 | Komarov et al. | |
| 2011/0197178 A1 | 8/2011 | Johnston | |
| 2011/0307863 A1 | 12/2011 | Malnati | |
| 2012/0102458 A1 | 4/2012 | Meijer et al. | |
| 2012/0110030 A1* | 5/2012 | Pomponio | G06F 8/36 707/805 |
| 2013/0268916 A1* | 10/2013 | Misra | G06F 8/74 717/123 |
| 2013/0339930 A1* | 12/2013 | Xu | G06F 11/3684 717/125 |
| 2014/0019937 A1 | 1/2014 | Clark et al. | |
| 2014/0173562 A1 | 6/2014 | Rothley et al. | |

OTHER PUBLICATIONS

"PYDOC—Documentation Generator and Online Help System", Published on: Dec. 17, 2014, Available at https://docs.python.org/2/library/pydoc.html.

(Continued)

*Primary Examiner* — John Chavis
(74) *Attorney, Agent, or Firm* — Thomas Marquis; Kate Drakos; Micky Minhas

(57) ABSTRACT

An item to be processed is received and scanned. The scan identifies any functions or procedures in the item being processed, and extracts actual code representing those functions or procedures. Any invoking functions, which invoke the identified function, are, themselves, identified. Actual code for the invoking function is extracted as well. An output documentation file is generated that includes a name of the identified function or procedure, as well as actual code for the function or procedure, and actual code from at least one example of an invoking function.

19 Claims, 12 Drawing Sheets

(56) References Cited

OTHER PUBLICATIONS

McBurney, et al.. "Automatic Documentation Generation via Source Code Summarization of Method Context", In Proceedings of the 22nd International Conference on Program Comprehension, Jun. 22, 2014, 12 pages.
Wojcicki, Julie C, "Auto-Generated Documentation", In Structured Writing and Content Engineering, Mar. 28, 2014, 4 pages.
International Search Report and Written Opinion for International Patent Application No. PCT/US2016/037952, date of mailing: Aug. 8, 2016, date of filing: Jun. 17, 2016, 11 pages.
Second Written Opinion for International Patent Application No. PCT/US2016/037952, date of mailing: Nov. 7, 2016, date of filing: Jun. 17, 2016, 5 pages.
Anonymous: "[Chapter 35] 35.10 Splitting Files by Context: csplit", Dec. 31, 2009, Retrieved from the Internet: URL:http://docstore.mik.ua/orelly/unix/upt/ch35_10.htm [retrieved on Oct. 27, 2016], 3 pages.
Anonymous: "Using Windows Search to Index your Source Code—Jim Lamb", Jan. 20, 2010, Retrieved from the Internet: URL:https://blogs.msdn.microsoft.com/jimlamb/2010/01/20/using-windows-search-to-index-your-source-code/ [retrieved on Oct. 27, 2016], 3 pages.

\* cited by examiner

DATA EXTRACTION AND GENERATION TOOL

BACKGROUND

Computing systems are currently in wide use. Some such computing systems are relatively large systems that include many hundreds or thousands of objects, each of which can include a set of functions. Such systems can also include hundreds or thousands of different forms, each having many different controls or control states.

Some of these types of systems generally provide a platform upon which a developer develops source code. The source code unlocks the capabilities and functionality of the platform and is stored, as a solution, in a data store, for use by end users. Thus, the various items in such a solution may be accessed by multiple different people. They may be accessed by the developer that developed the solution, or a different developer who wishes to understand how the solution works, so that modifications or customizations can be made. They may also be accessed by end users who may wish to obtain help in determining how to use the solutions. Further, they may be accessed by test engineers in order to determine whether the entire solution is being adequately tested.

Such computing systems are often heavily customized For instance, a base computing system may be developed or generated by a software manufacturer. The base computing system may be customized by a value added reseller or independent software vendor to generate a customized version. That customized version may be further customized at an end user organization, in order to meet the specific needs of the customization. In such an environment, it is difficult to keep help files, and other documentation, in general, up-to-date so that they can be accessed in a meaningful way.

The discussion above is merely provided for general background information and is not intended to be used as an aid in determining the scope of the claimed subject matter.

SUMMARY

An item to be processed is received and scanned. The scan identifies any functions or procedures in the item being processed, and extracts actual code representing those functions or procedures. Any invoking functions, which invoke the identified function, are, themselves, identified. Actual code for the invoking function is extracted as well. An output documentation file is generated that includes a name of the identified function or procedure, as well as actual code for the function or procedure, and actual code from at least one example of an invoking function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
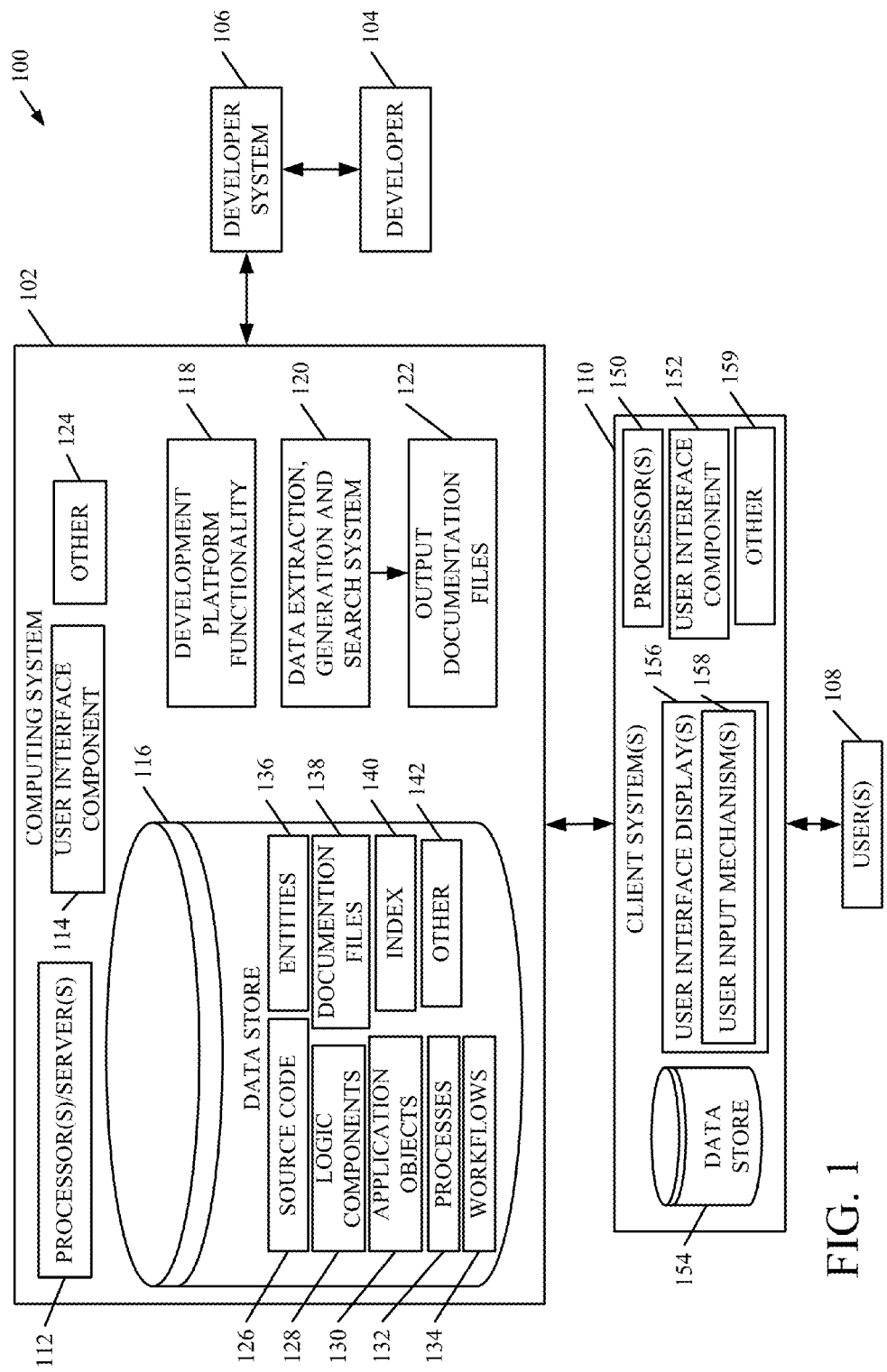
FIG. 1 is a block diagram of one example of a computing system architecture.

FIG. 1 is a block diagram of one example of a computing system architecture 100. Architecture 100 illustratively includes computing system 102 that can be accessed by a developer 104, through a developer system 106. FIG. 1 also shows that computing system 102 can be accessed by one or more users 108 through one or more client systems 110.

Computing system 102, itself, illustratively includes servers or processors 112, user interface component 114, data store 116, development platform functionality 118, data extraction, generation and search system 120 (which produces output documentation files 122), and it can include other items 124. Data store 116 can include source code 126, logic components 128, application objects 130, processes 132, workflows 134, entities 136, documentation files 138, an index 140, and it can include a wide variety of other information 142. Development platform functionality 118 illustratively exposes functionality of the computing system 102 so that it can be configured or otherwise developed by developer 104 through developer system 106. The developer 104 illustratively builds source code 126, logic components 128, application objects 130, etc. to generate a solution.

Users 108 illustratively use the solution generated by developer 104, such as through client system 110. Client system 110 can include one or more processors 150, user interface components 152, data store 154, user interface displays 156 that may include user input mechanisms 158, and it can include other items 159. Users 108 illustratively interact with user input mechanisms 158 in order to control and manipulate the solution provided by computing system 102, and that was developed by developer 104.

The solution implemented by computing system 102 is thus built on top of the platform functionality 118 that developer 104 uses to code or otherwise configure the system for use by users 108. In generating the solution, there may be multiple different levels of developers involved as well. Each different level of development may include its own customizations to a base computing system in order to arrive at the final solution that is deployed at an end user organization and used by the end users.

It can thus be difficult to gain a full understanding of the eventual items that comprise the solution that is either being developed or used. For instance, it may be difficult to even identify all of the items of source code 126, logic components 128, application objects 130, processes 132, workflows 134, entities 136, etc. It can also be difficult to know the various functions or procedures that are employed, what they do, and how they are used (e.g., how they are invoked by other functions or procedures in the system).

Data extraction generation and search system 120 thus extracts information from the various items that make up the solution, and generates output documentation files 122 that can be consumed by a variety of different consumers. They can be consumed by end users 108, by developer 104 or other developers who are examining the code, by various managers, test engineers, etc. System 120 generates the output documentation files 122 automatically. By automatically, it is meant that system 120 generates the output files with no substantial input from a human being, other than perhaps to initiate the process, or authorize the process.

Figure 2:
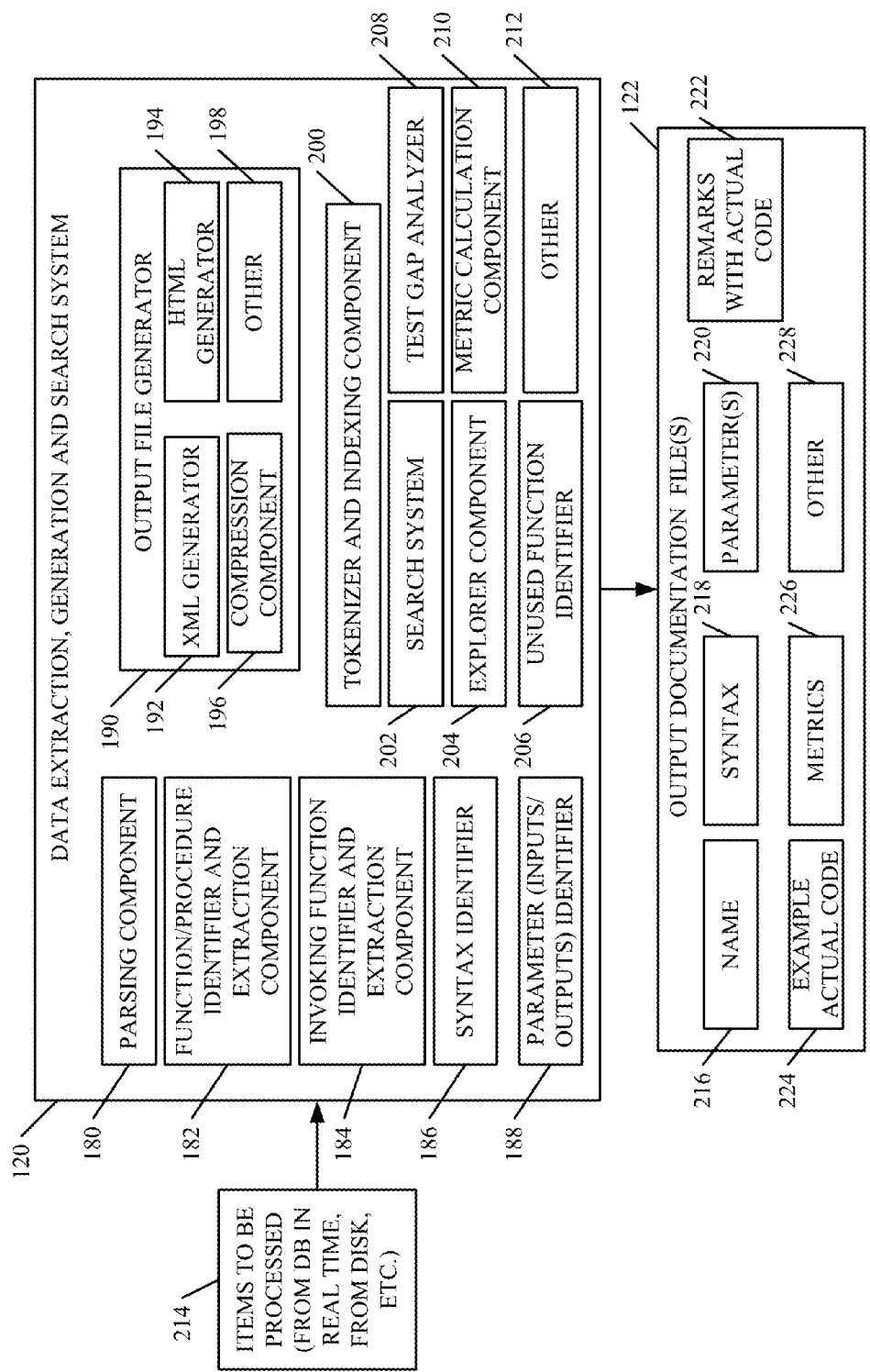
FIG. 2 is a more detailed block diagram of one example of a data extraction, generation and search system.

FIG. 2 is a more detailed block diagram of one example of data extraction, generation and search system 120. In the example shown in FIG. 2, system 120 illustratively includes parsing component 180, function/procedure identifier and extraction component 182, invoking function identifier and extraction component 184, syntax identifier 186, parameter (e.g., input/output) identifier 188, output file generator 190 (which, itself, can include XML generator 192, HTML generator 194, compression component 196 or other items 198), tokenizer and indexing component 200, search system 202, explorer component 204, unused function identifier 206, test gap analyzer 208, metric calculation component 210, and it can include other items 212. System 120 is shown in FIG. 2 as receiving one or more items to be processed 214. The items to be processed can be received from data store 116. Therefore, they can include source code items, logic components, application components, or a wide variety of other things. They can be received in real time (such as when they are triggered by a change to one of the items in data store 116), or they can be received from a disk so that the items can be processed without interacting with the data store 116 in real time.

FIG. 2 also shows a more detailed block diagram of one example of an output documentation file 122. In the example shown in FIG. 2, file 122 illustratively includes name identifier 216, syntax identifier 218, parameter identifier 220, remarks section 222 (that illustratively contains actual code for any function or procedure identified), example section 224 (that illustratively includes actual code from an invoking function or procedure), a variety of different metrics 226, and it can include other items 228.

Before describing the operation of system 120 in more detail, a brief overview will first be provided. Parsing component 180 illustratively parses the item to be processed 214 into its individual pieces. Function/procedure identifier and extraction component 182 then identifies any functions or procedures in the item and extracts the actual code of the identified functions or procedures. Invoking function identifier and extraction component 184 performs a cross-reference analysis to identify any other functions or procedures that call the functions or procedures identified by component 182, in the current item being processed 214. In the event that no other functions or procedures call the present function, then unused function identifier 206 identifies the present function as being not used. It can also identify the function as being not heavily used, if the number of invoking functions or procedures is below a threshold value, for instance. Assuming that there is an invoking function, then the actual code for at least one invoking function or procedure is extracted by extractor 184.

The syntax of the function or procedure being processed is identified by identifier 186 and the parameters are identified by identifier 188.

Metric calculation component 210 can also calculate a wide variety of different metrics for the item being processed. Some of these are discussed in greater detail below.

Output file generator 190 then uses XML generator 192 to generate an XML representation of the item being processed, and HTML generator 194 generates an HTML representation, from the XML representation. It will be noted that, instead of XML and HTML, other outputs could be generated instead or in addition. These are examples only. Compression component 196 can be used to compress a set of HTML representations into a single document. Tokenizer and indexing component 200 tokenizes the file and indexes it in index 140. At that point, the output documentation file is also stored in data store 116, and it can be accessed for a variety of different reasons.

For instance, it can be accessed by search system 202. Search system 202 may receive a search query or search input from a user or developer and execute the search against index 140 to identify documentation files that are relevant to the search. Explorer component 204 illustratively generates a visualization of the documentation files so that they can be reviewed or otherwise explored by a user or a developer. Test gap analyzer 208 can analyze the contents of the file to determine whether any functions or procedures represented in the file have adequate test APIs generated for them, and a wide variety of other analyses can be performed as well.

Figure 3:
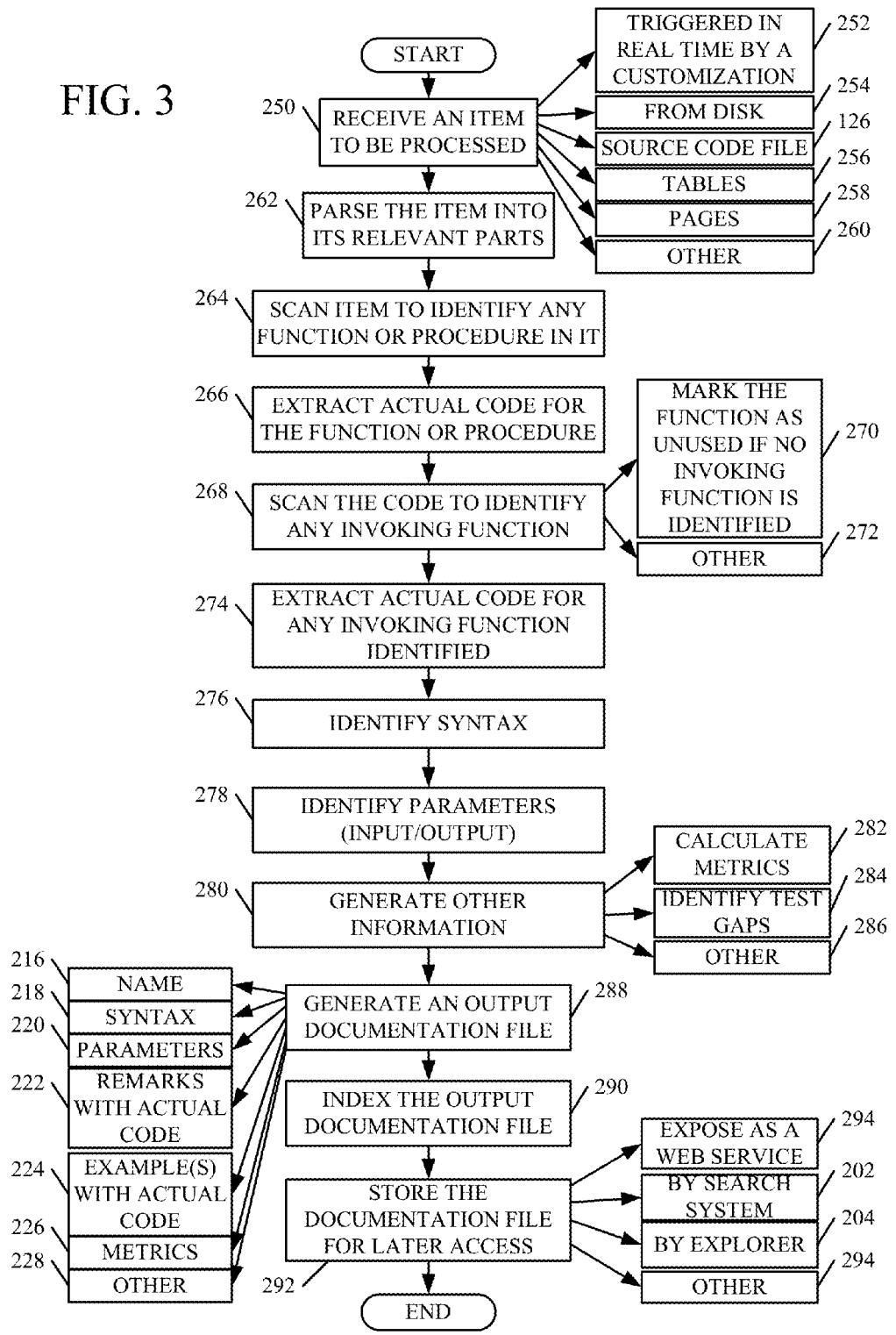
FIG. 3 is a flow diagram illustrating one example of the operation of the systems shown in FIGS. 1 and 2 in identifying and extracting information to be included in an output documentation file.

FIG. 3 is a flow diagram illustrating one example of the operation of data extraction, generation and search system 120, in more detail. System 120 first receives the item to be processed 214. This is indicated by block 250 in the flow diagram of FIG. 3. Again, this can be triggered in real time by a customization made to one of the items in data store 116, or otherwise. This is indicated by block 252. The item can be received offline, such as from a disk 254. The item can be a source code file 126, one or more tables 256, one or more pages 258, or a wide variety of other items (such as application objects, logic components, processes, workflows, etc.).

Parsing component 180 then parses the received item into its relevant parts. This is indicated by block 262. Function/procedure identifier and extraction component 182 illustratively scans the item to identify any functions or procedures in it. This is indicated by block 264. It then extracts actual code implemented by the function or procedure. This is indicated by block 266.

Invoking function identifier component and extraction component 184 then scans the other code (or performs a cross reference analysis in another way) to identify any invoking functions (those functions or procedures which call the identified function). This is indicated by block 268. If there are no other functions or procedures that call the identified function, or if there are a relatively low number of them, then unused function identifier 206 can mark the function as being unused (or lightly used). This is indicated by block 270. Identifying the invoking functions can be performed in other ways as well, as indicated by block 272.

Assuming, at block 268, that there is at least one invoking function identified, then component 184 extracts the actual code for at least one of the invoking functions that were identified. This is indicated by block 274. This can be done in a wide variety of different ways. For instance, extractor 184 may identify which function or procedure invokes the present function or procedure most often, during runtime. It may extract the code from that function or procedure as the example of an invoking function. It may also identify which function or procedure has most recently invoked the present function or procedure, and extract code from that as an example. It can extract code from an example invoking function in other ways as well.

Syntax identifier 186 then identifies the syntax of the function or procedure, as indicated by block 276. Parameter identifier 188 identifies the parameters (the inputs and/or outputs) for the function or procedure as indicated by block 278. System 120 then generates any other information that may be desired for an output documentation file. This is indicated by block 280.

By way of example, metric calculation component 210 can calculate a set of metrics 282 for the item being analyzed. Some examples of different metrics that may be calculated include statistics about the rate of usage of the item being analyzed, the impacted feature areas that are impacted by the item being analyzed, a measure of time spent on generating the documentation for the current item being analyzed, the number of lines of code in the item being analyzed, whether the item is obsolete or whether its functions are non-referenced functions, etc.

Test gap analyzer 208 can also identify whether there are any test gaps with respect to the item being analyzed. This is indicated by block 284. For instance, it may be determined whether sufficient test APIs have been generated to test all the various functionality of the item being analyzed. If not, it can identify the un-tested areas as corresponding to a test gap. The other information generated for the output documentation file can be generated in a wide variety of other ways 286 as well.

Once the information has been extracted or generated, output file generator 190 illustratively generates an output documentation file. This is indicated by block 288. As shown in FIG. 2, the output documentation file can include a name 216, a syntax identifier 218, a parameter identifier 220, a remarks section that shows the actual code of the function or procedure being processed as indicated by block 222, an example section that includes an actual code example of an invoking function, as indicated by block 224, the various metrics that are calculated, as indicated by block 226, or a wide variety of other things 228.

Tokenizer and indexing component 200 then breaks the file into its tokens (such as words, word strings, or other tokens) and indexes the file in index 140. This is indicated by block 290 in FIG. 3. The documentation file is then stored in data store 116 for later access. This is indicated by block 292. It can be exposed as a web service so that various people or organizations can access the documentation file. This is indicated by block 294. It can also be accessed by search system 202, by explorer 204, or in other ways as indicated by block 294.

Figure 4:
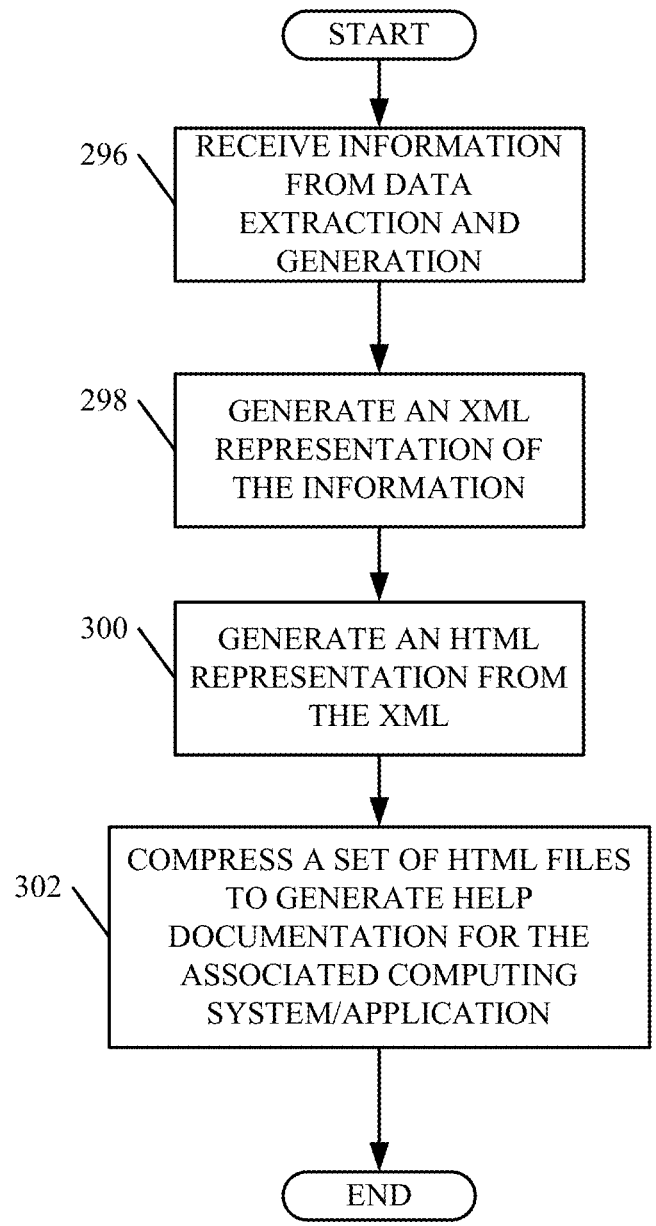
FIG. 4 is a flow diagram illustrating one example of the operation of the system shown in FIGS. 1 and 2 in generating an output documentation file.

FIG. 4 is a flow diagram illustrating one example of the operation of output file generator 190 in more detail. In one example, output file generator 190 first receives the information extracted or generated by the various data extraction and generation components in system 120. This is indicated by block 296. For instance, it can receive a name of a function or procedure being processed from parsing component 180. It can receive the identities of the various functions or procedures, along with the actual code, the invoking functions or procedures and actual code for them, the various parameters, metrics, etc.

Based on this information, XML generator 192 generates an XML representation of that information. This is indicated by block 298. HTML generator 194 then generates an HTML representation, from the XML representation. This is indicated by block 300. As mentioned above, XML and HTML are examples only. Compression component 196 can then compress a set of HTML files to generate help documentation for the associated computing system or application. This is indicated by block 302.

Figure 5:
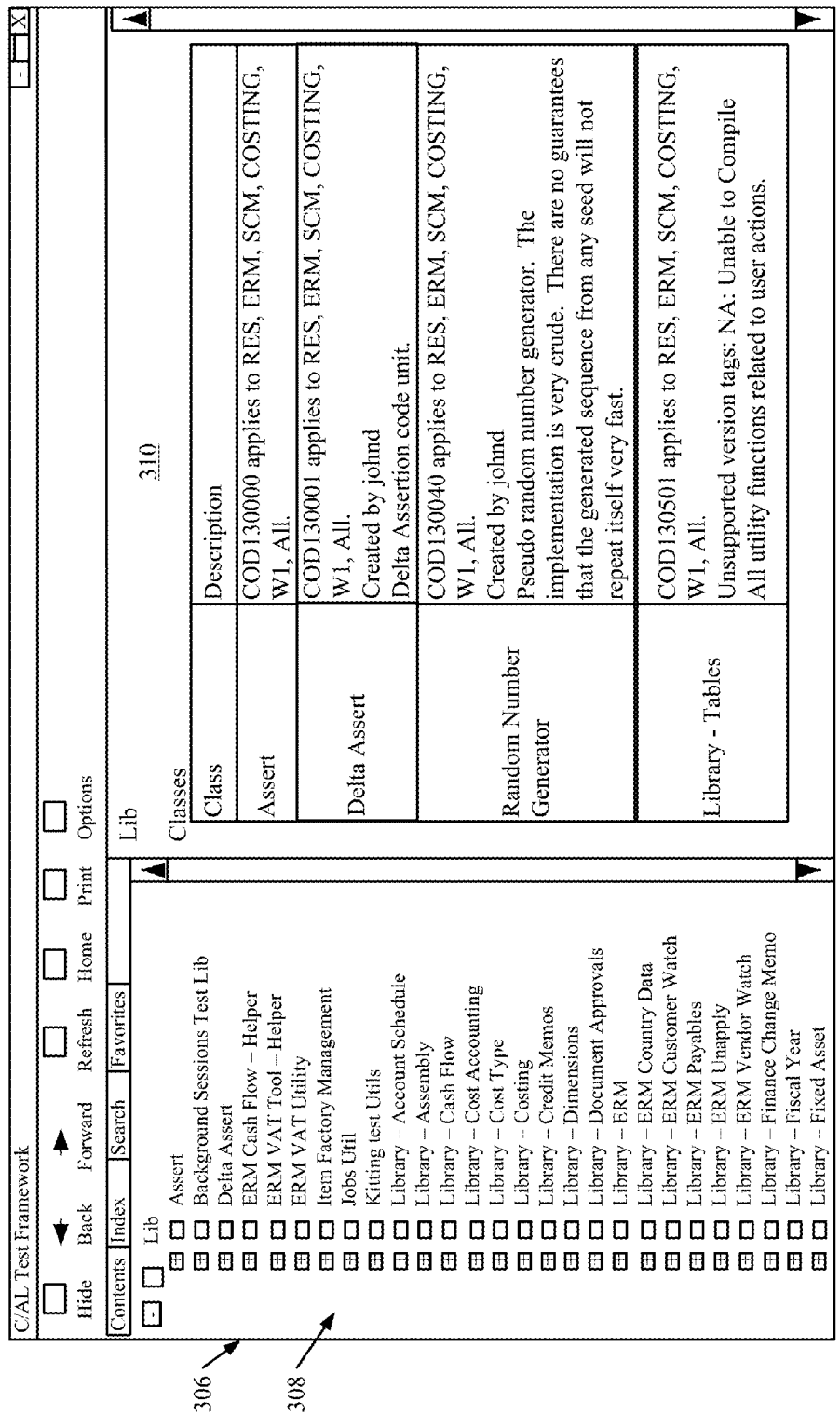
FIGS. 5-7 show various user interface displays depicting example visualizations of an output documentation file.

FIG. 5 shows one example of a user interface display 306 that shows how a user may view a compressed set of HTML documents. User interface display 306 illustratively includes a hierarchical representation 308 of all the items in the compressed file. Pane 310 shows more detail for the items illustrated in the hierarchical representation 308.

Figure 6:
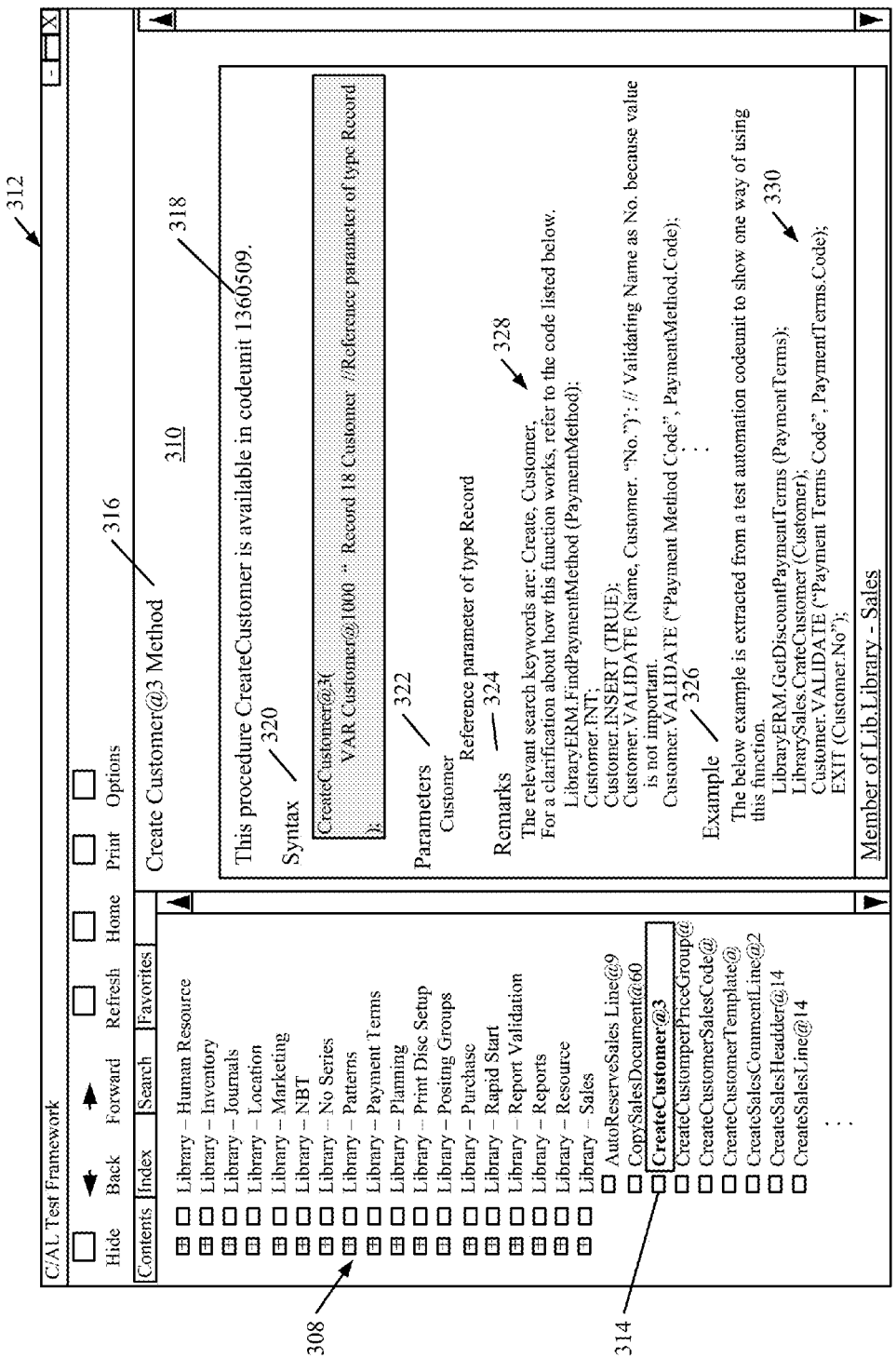

FIG. 6 shows another example of a user interface display 312. Again, pane 310 shows a hierarchical representation 308 of the various items in the compressed file. It can be seen that he user has selected the "Create Customer" node 314 in hierarchy 308. In that case, pane 310 now shows more detailed information from the documentation file corresponding to the highlighted node. In the specific example shown in FIG. 6, pane 310 shows the documentation file generated for the "Create Customer" procedure. It identifies a particular source code file or code unit that the procedure is in. It has a name section 316 that identifies a name of the procedure and it identifies the code unit or source file (at 318) where the procedure is contained. It includes syntax identifier 320, parameter identifier 322, remarks section 324, and example section 326. It will be noted that the remarks section 324 not only includes a general description of some aspects of the procedure, but it also includes an actual code section 328 showing actual code corresponding to the procedure. In addition, example section 326 includes an actual code section 330 that shows the actual code for another procedure or function that invokes the "Create Customer" procedure.

It will be noted that, because the actual code sections 328 and 330 contain actual code from the computing system (e.g., the application or solution) that is being analyzed, these code sections can be highly useful. Instead of having a fictional example of code that might be written, the actual code can make reuse of functions or other items within the application or solution very easy. This not only enhances the efficiency of the developer or user, but it can also enhance the efficiency of the development system.

Figure 7:
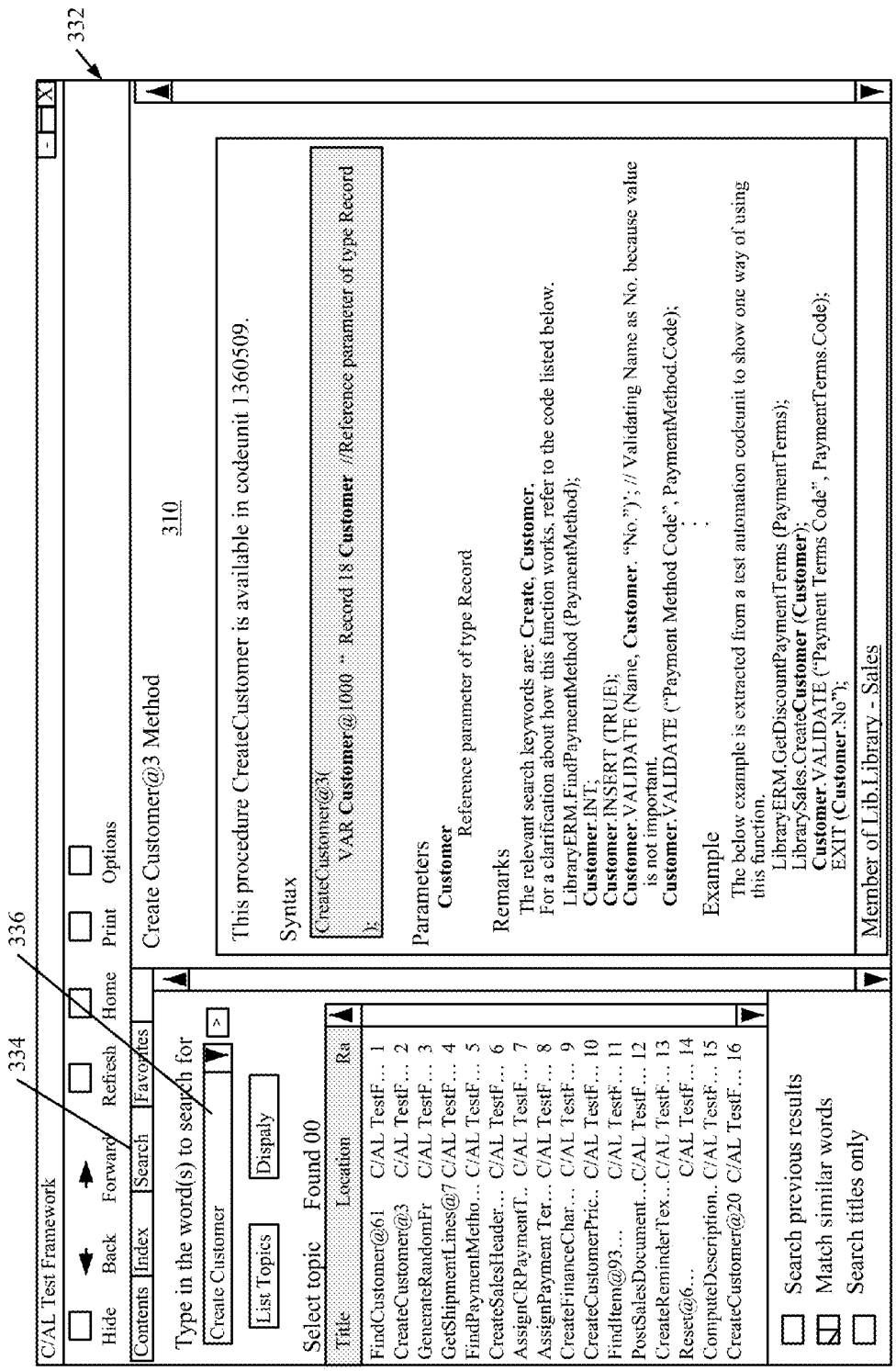

FIG. 7 shows yet another example of a user interface display 332. User interface display 332 shows that the user has now invoked the search system 202 (shown in FIG. 2), by highlighting search tab 334. When the user does this, a search mechanism (such as a text box 336) is displayed to allow the user to select or input a search term or a set of search terms. In the example shown in FIG. 7, the user has input the terms "Create Customer". Thus, search system 202 searches index 140 in computing system 102 to identify various items in documentation files 138 that contain the terms "Create Customer".

It can be seen in pane 310 that the user has highlighted the "Create Customer" procedure at node 338. Thus, pane 310 now shows the same detail from the documentation file generated for the "Create Customer" procedure, as was shown in FIG. 6. However, it can now be seen that all instances of the search terms (e.g., "Create Customer") that were entered by the user are highlighted in pane 310 as well. This gives the user an indication as to why this particular file was returned as a search result.

It can thus be seen that system 120 generates documentation files that are easily searchable while working on development or during test automation. Also, it generates documentation that can be released to help partners or other developers or users easily adopt and understand (and thus be capable of reusing and extending) the applications or other solutions deployed in computing system 102. The documentation files can be updated or generated automatically when a developer saves a new development to data store 116 (or when it is compiled). Therefore, the documentation is up-todate and automatically refreshable. As is described in greater detail below, it can also be exposed through a cloud-based interface, as a service, or otherwise.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
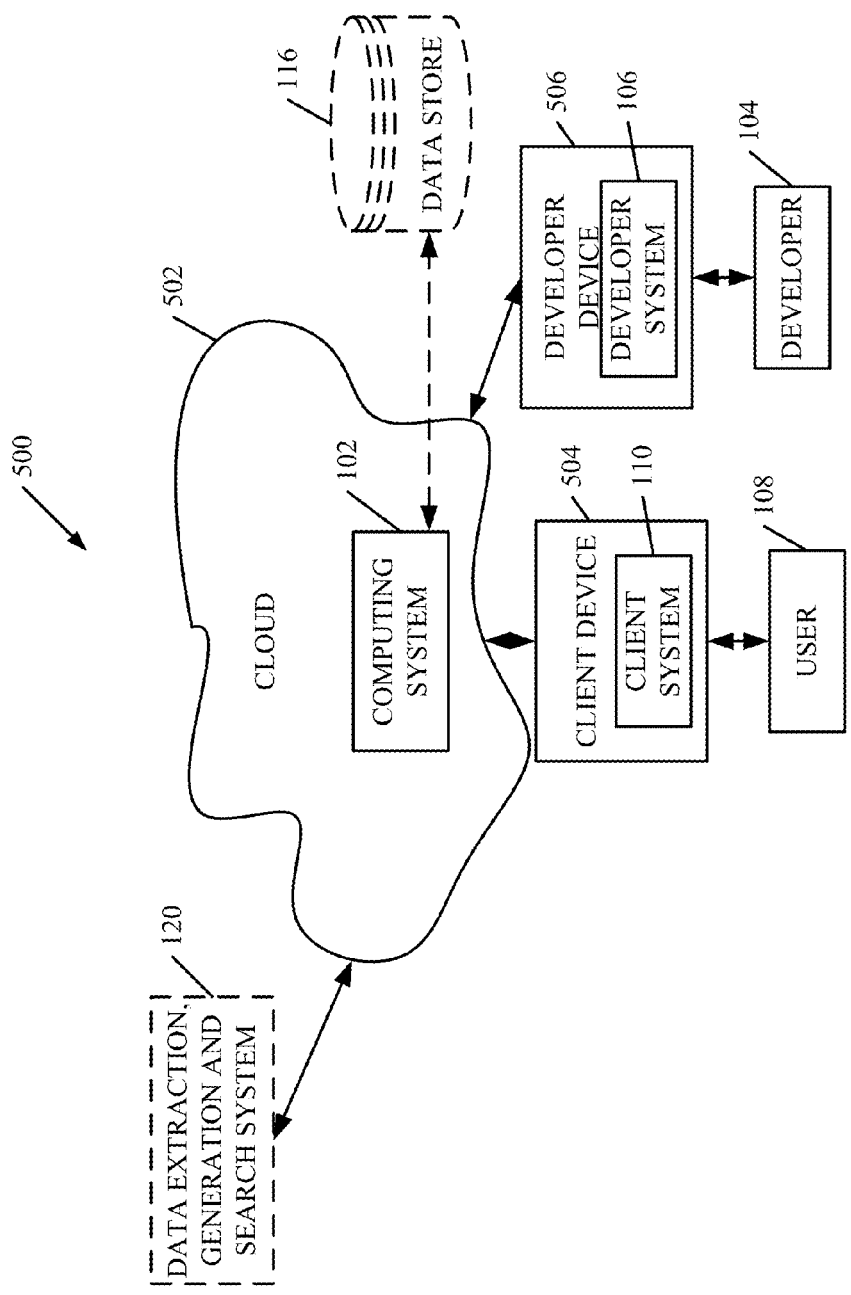
FIG. 8 shows a block diagram of the architecture shown in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing system 102 can be located in cloud 502 (which can be public, private, or a combination where portions are public while others are private). Therefore, user 108 uses a client device 504 and developer 104 uses a developer device 506 to access those systems through cloud 502.

FIG. 8 also depicts another example of a cloud architecture. FIG. 4 shows that it is also contemplated that some elements of architecture 100 can be disposed in cloud 502 while others are not. By way of example, data store 116 (and output documentation files 122) can be disposed outside of cloud 502, and accessed through cloud 502. In another example, system 120 can also be outside of cloud 502. Regardless of where they are located, they can be accessed directly by devices 504 or 506, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 or 500, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
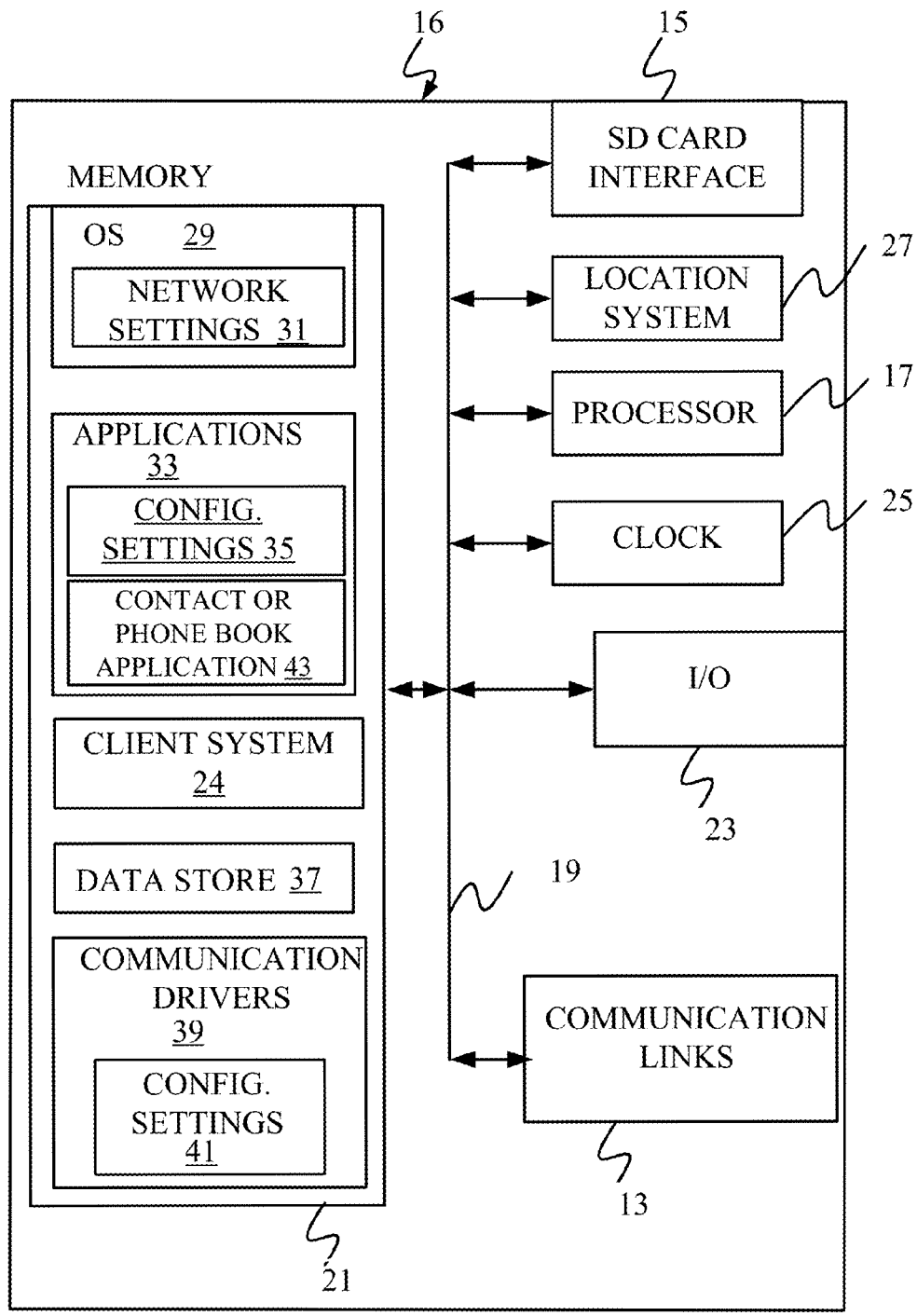
FIGS. 9-11 show examples of mobile devices that can be used in architectures shown in the previous Figures.
Figure 10:
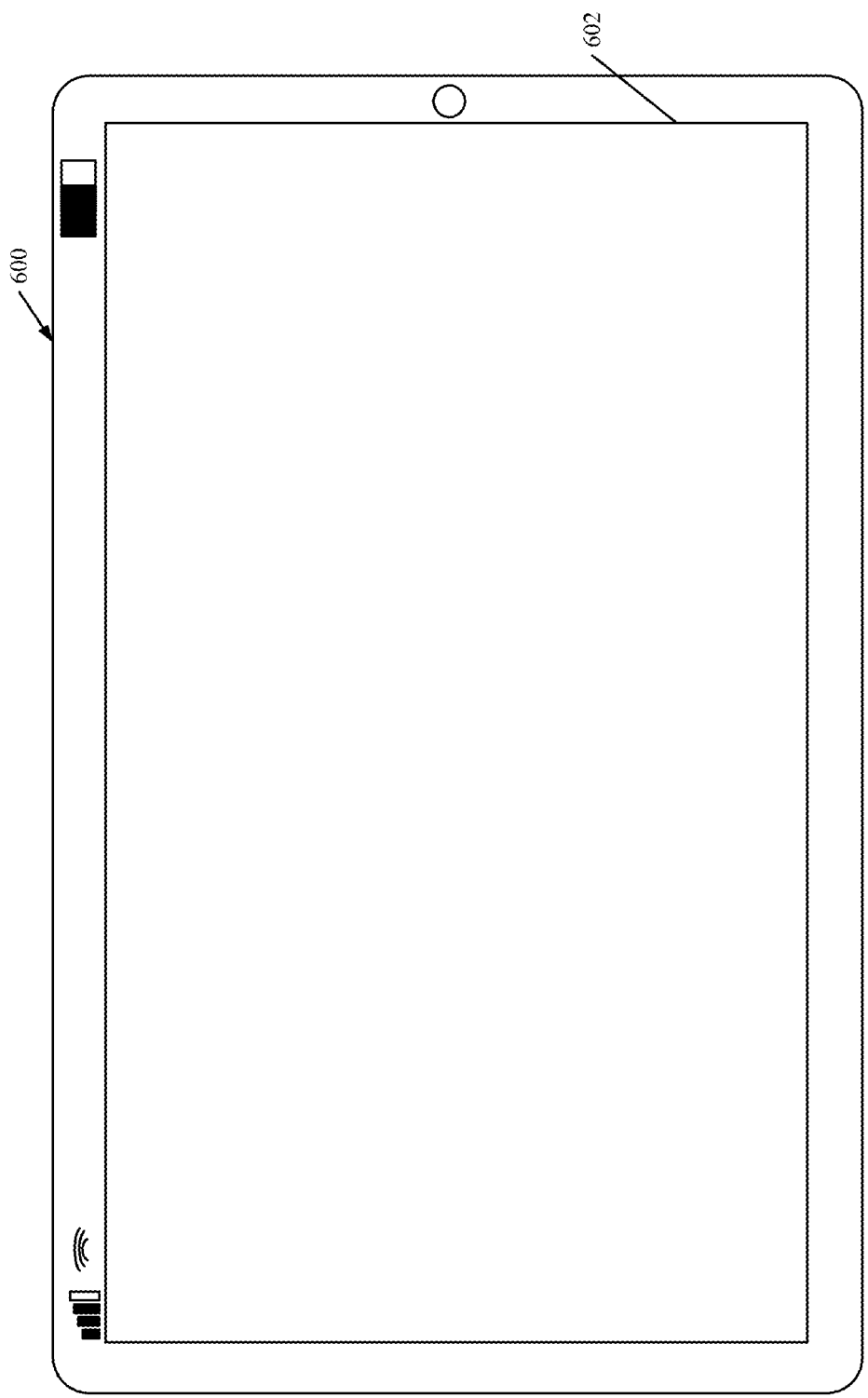
Figure 11:
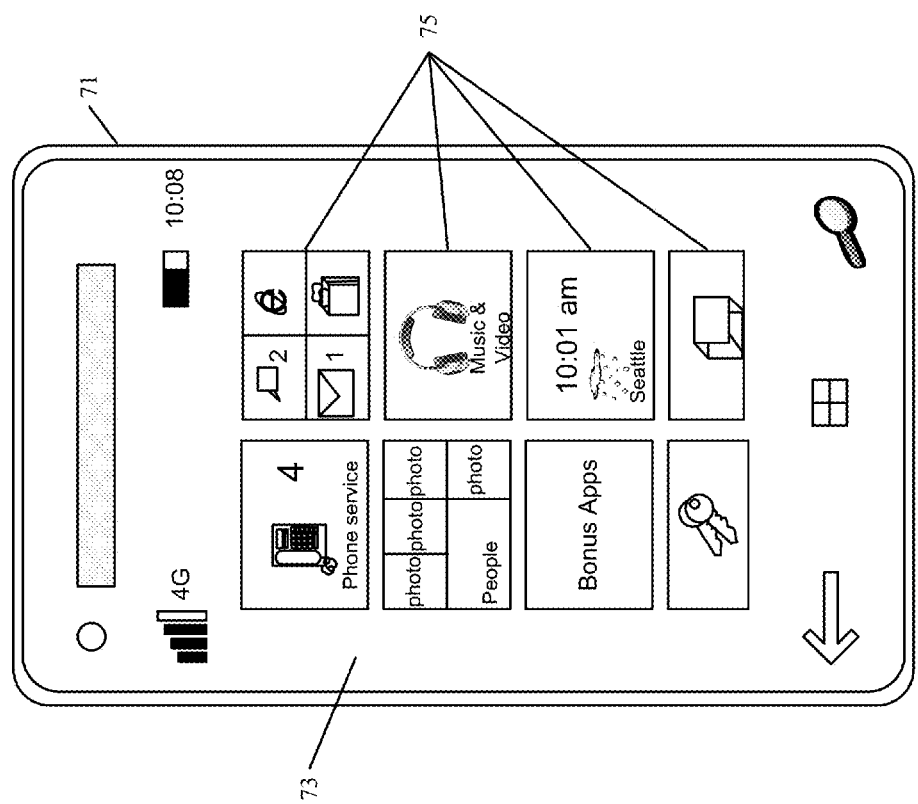

FIG. 9 is a simplified block diagram of one illustrative embodiment of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of architecture 100 or 500 interacts with architecture 100 or 500, or both. In the device 16, a communications link 13 is provided that allows the handheld device to communicate with other computing devices and under some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 112 from FIG. 1 or other processors or servers in systems 106 or 110) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
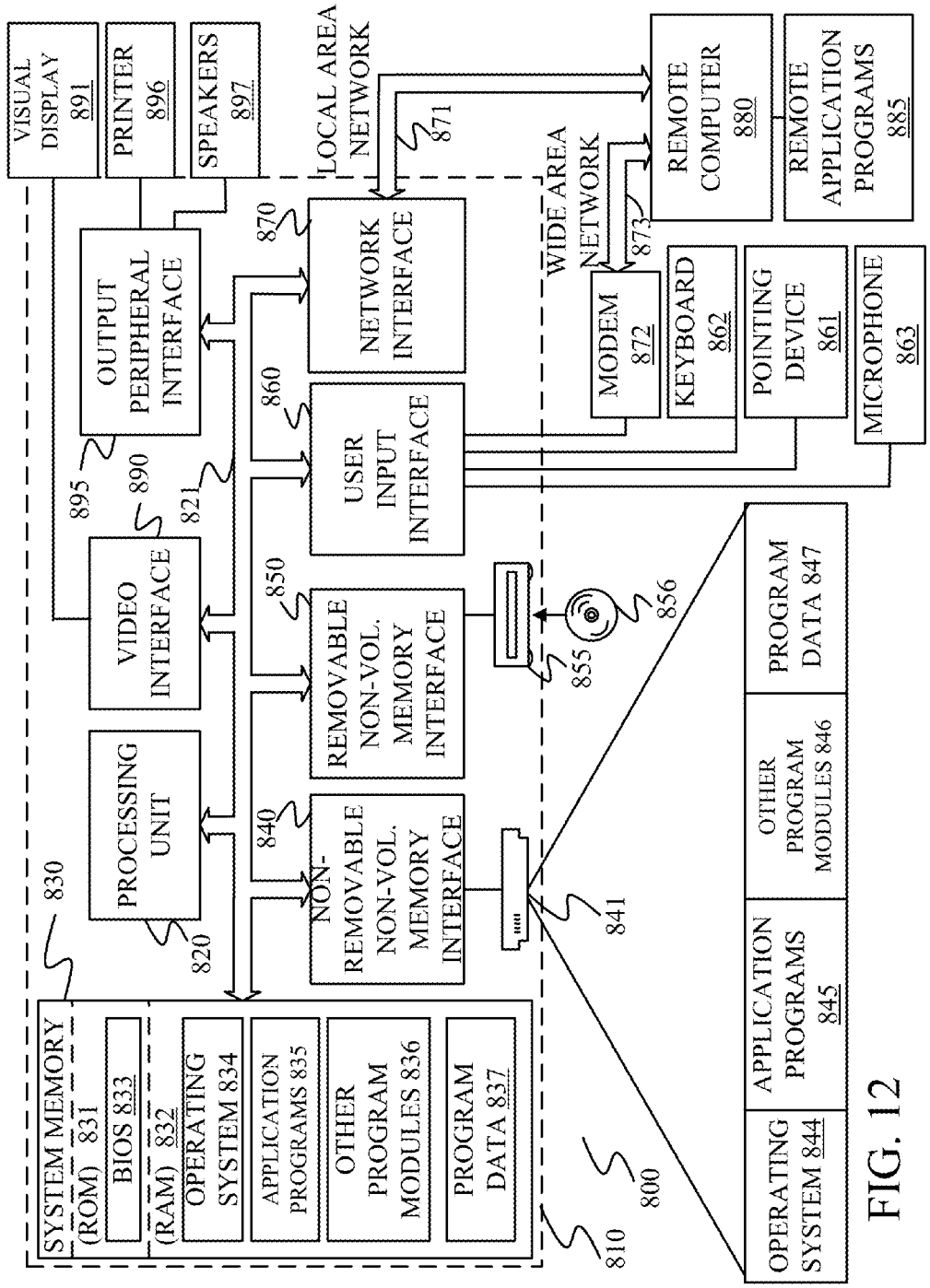
FIG. 12 is a block diagram of one example of a computing environment that can be used in the architectures shown in previous Figures.

FIG. 12 is one example of a computing environment in which architecture 100 or 500, or parts of them, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers 112 or other processors or servers in architecture 100 or 500), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous Figures can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a function identifier and extraction component that receives an item to be processed and identifies a function in the item to be processed and code that implements the identified function and that extracts the identified code; and a file generator that generates a file indicative of the identified function, and that adds the extracted code to the file.

Example 2 is the computing system of any or all previous examples wherein the file generator comprises:

an XML generator component that generates the file indicative of the identified function as an XML file.

Example 3 is the computing system of any or all previous examples and further comprising:

an invoking function identifier and extraction component that identifies, as an invoking function, a separate function that invokes the identified function and extracts code that implements the invoking function.

Example 4 is the computing system of any or all previous examples wherein the file generator generates the file by including an example section, the example section indicating the invoking function is a usage example for the identified function and including, in the example section, the code that implements the invoking function.

Example 5 is the computing system of any or all previous examples wherein the file generator comprises:

an HTML generator that generates an HTML representation of the XML file.

Example 6 is the computing system of any or all previous examples wherein the HTML generator generates a set of HTML representations from a set of XML files for a set of functions, identified by the function identifier and extraction component, in a solution, and wherein the file generator further comprises:

a compression component that compresses the set of HTML files as a set of documentation files for the solution.

Example 7 is the computing system of any or all previous examples and further comprising:

an unused function identifier that determines whether the identified function has a usage level that is below a threshold level and, if so, indicates that the identified function has a low usage level.

Example 8 is the computing system of any or all previous examples and further comprising:

a test gap analyzer that accesses test application programming interfaces (test APIs) for the item being processed, the test APIs being invoked to test features of the item being processed, the test gap analyzer determining whether the identified function has a corresponding test API and, if not, identifying a test gap corresponding to the identified function.

Example 9 is the computing system of any or all previous examples and further comprising:

a syntax identifier that identifies a syntax for the identified function, the file generator including a syntax indicator indicative of the identified syntax in the file.

Example 10 is the computing system of any or all previous examples and further comprising:

a parameter identifier that identifies a set of parameters for the identified function, the file generator including a set of parameter indicators, indicative of the set of parameters, in the file.

Example 11 is the computing system of any or all previous examples and further comprising:

a metric calculation component that calculates a set of metrics for the identified function and the file generator including a set of metric indicators, indicative of the set of metrics, in the file.

Example 12 is the computing system of any or all previous examples and further comprising:

a tokenizer and indexer component that tokenizes the file and indexes the file in an index searchable by a search system.

Example 13 is the computing system of any or all previous examples and further comprising:

an explorer component that surfaces a navigable visualization of the file for user interaction.

Example 14 is the computing system of any or all previous examples wherein the item to be processed comprises at least one of a source code file, a table and a page.

Example 15 is a computer implemented method, comprising:

receiving an item to be processed, the item being a part of a solution;

identifying a function in the item to be processed;

extracting code implementing the identified function in the item to be processed;

identifying, as an invoking function, a separate function in the solution that invokes the identified function;

extracting code that implements the invoking function; and generating a file indicative of the identified function, the file including a descriptive section that describes the identified function and that includes the code that implements the identified function, and an example section that includes the code that implements the invoking function.

Example 16 is the computer implemented method of any or all previous examples wherein generating a file comprises:

generating the file indicative of the identified function as an XML file; and generating an HTML representation of the XML file.

Example 17 is the computer implemented method of any or all previous examples wherein generating the HTML file includes generating a set of HTML representations from a set of XML files for a set of functions, identified in a solution, and wherein generating the file further comprises:

compressing the set of HTML files as a set of documentation files for the solution.

Example 18 is the computer implemented method of any or all previous examples and further comprising:

determining whether the identified function has a usage level that is below a threshold level; and if so, indicating that the identified function has a low usage level.

Example 19 is the computer implemented method of any or all previous examples and further comprising:

accessing test application programming interfaces (test APIs) for the item being processed, the test APIs being invoked to test features of the item being processed;

determining whether the identified function has a corresponding test API; and if not, identifying a test gap corresponding to the identified function.

Example 20 is a computing system, comprising:

a function identifier and extraction component that receives an item to be processed and identifies a function in the item to be processed and code that implements the identified function and that extracts the identified code;

an invoking function identifier and extraction component that identifies, as an invoking function, a separate function that invokes the identified function and extracts code that implements the invoking function;

an unused function identifier that determines whether the identified function has a usage level that is below a threshold level and, if so, indicates that the identified function has a low usage level;

a test gap analyzer that accesses test application programming interfaces (test APIs) for the item being processed, the test APIs being invoked to test features of the item being processed, the test gap analyzer determining whether the identified function has a corresponding test API and, if not, identifying a test gap corresponding to the identified function; and a file generator that generates an XML file indicative of the identified function, and that adds the extracted code to the file, the file by including an example section, the example section indicating the invoking function is a usage example for the identified function and including, in the example section, the code that implements the invoking function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable by the processor, wherein the instructions configure the computing system to:
   receive an item to be processed;
   identify a function in the item to be processed and code that implements the identified function;
   extract the identified code;
   identify, as an invoking function, a separate function that invokes the identified function; and
   generate a file indicative of the identified function, wherein the generated file includes the extracted code and an example section, the example section indicating the invoking function is a usage example for the identified function and including, in the example section, code that implements the invoking function.

2. The computing system of claim 1 wherein the instructions configure the computing system to:
   generate the file indicative of the identified function as an XML file.

3. The computing system of claim 2 wherein the instructions configure the computing system to:
   extract the code that implements the invoking function.

4. The computing system of claim 3 wherein the instructions configure the computing system to:
   generate a markup language representation of the XML file.

5. The computing system of claim 4 wherein the instructions configure the computing system to:
   generate a set of markup language representations from a set of XML files for a set of functions based on the invoking function; and
   compress the set of markup language representations as a set of documentation files for the solution.

6. The computing system of claim 1 wherein the instructions configure the computing system to:
   determine whether the identified function has a usage level that is below a threshold level and, if so, indicate that the identified function has a low usage level.

7. The computing system of claim 1 wherein the instructions configure the computing system to:
   access a test application programming interface (test API) for the item being processed, the test API being invoked to test a feature of the item being processed; and
   determine whether the identified function has a corresponding test API and, if not, identify a test gap corresponding to the identified function.

8. The computing system of claim 1 wherein the instructions configure the computing system to:
   identify a syntax for the identified function; and
   generate a syntax indicator indicative of the identified syntax in the file.

9. The computing system of claim 8 wherein the instructions configure the computing system to:
   identify a parameter for the identified function; and
   generate a parameter indicator, indicative of the parameter, in the file.

10. The computing system of claim 9 wherein the instructions configure the computing system to:
    calculate a metric for the identified function; and
    generate a metric indicator, indicative of the metric, in the file.

11. The computing system of claim 1 wherein the instructions configure the computing system to:
    tokenize the file; and
    index the file in an index searchable by a search system.

12. The computing system of claim 1 wherein the instructions configure the computing system to:
    generate a representation of a navigable visualization of the file for user interaction.

13. The computing system of claim 1 wherein the item to be processed comprises at least one of a source code file, a table, or a page.

14. A computer implemented method, comprising:
    receiving an item to be processed, the item being a part of a solution;
    identifying a function in the item to be processed;
    extracting code implementing the identified function in the item to be processed;
    identifying, as an invoking function, a separate function in the solution that invokes the identified function;
    extracting code that implements the invoking function; and
    generating a file indicative of the identified function, the file including a descriptive section that describes the identified function and that includes the code that implements the identified function, and an example section that includes the code that implements the invoking function.

15. The computer implemented method of claim 14 wherein generating a file comprises:
    generating the file indicative of the identified function as an XML file; and
    generating a markup language representation of the XML file.

16. The computer implemented method of claim 15 wherein generating the markup language representation includes generating a set of markup language representations from a set of XML files for a set of functions, identified in a solution, and wherein generating the file further comprises:
    compressing the set of markup language representations as a set of documentation files for the solution.

17. The computer implemented method of claim 14 and further comprising:
    determining whether the identified function has a usage level that is below a threshold level; and
    if so, indicating that the identified function has a low usage level.

18. The computer implemented method of claim 14 and further comprising:
    accessing test application programming interfaces (test APIs) for the item being processed, the test APIs being invoked to test features of the item being processed;
    determining whether the identified function has a corresponding test API; and
    if not, identifying a test gap corresponding to the identified function.

19. A computing system, comprising:

a processor; and memory storing instructions executable by the processor, wherein the instructions configure the computing system to:
- receive an item to be processed;
- identify a function in the item to be processed and code that implements the identified function;
- extract the identified code;
- identify, as an invoking function, a separate function that invokes the identified function;
- extract code that implements the invoking function;
- determine whether the identified function has a usage level that is below a threshold level and, if so, indicate that the identified function has a low usage level;
- access a test application programming interface (test API) for the item being processed, the test API being invoked to test a feature of the item being processed;
- determine whether the identified function has a corresponding test API and, if not, identify a test gap corresponding to the identified function; and
- generate an XML file indicative of the identified function; and
- add the extracted code to the file, the file by including an example section, the example section indicating the invoking function is a usage example for the identified function and including, in the example section, the code that implements the invoking function.

* * * * *